US007535338B2

(12) United States Patent
Frederick et al.

(10) Patent No.: US 7,535,338 B2
(45) Date of Patent: May 19, 2009

(54) WIRELESS SYNCHRONIZED OPERATION OF PULSED EAS SYSTEMS

(75) Inventors: Thomas J. Frederick, Chapel Hill, NC (US); Jeffrey Thomas Oakes, Boca Raton, FL (US); Richard Frederick, Lighthouse Point, FL (US); Richard Herring, Cary, NC (US)

(73) Assignee: Sensormatic Electronics Corporation, Boca Raton, FL (US)

( * ) Notice: Subject to any disclaimer, the term of this patent is extended or adjusted under 35 U.S.C. 154(b) by 220 days.

(21) Appl. No.: 11/475,772

(22) Filed: Jun. 27, 2006

(65) Prior Publication Data

US 2007/0296591 A1 Dec. 27, 2007

(51) Int. Cl.
*H04Q 5/22* (2006.01)

(52) U.S. Cl. ................ 340/10.1; 340/572.1; 340/572.4; 340/10.2; 340/10.3; 375/356; 375/376

(58) Field of Classification Search ............. 340/10.51, 340/572.1, 506, 10.1, 572.4, 572.8, 825.54, 340/10.2, 10.3; 375/356, 376
See application file for complete search history.

(56) References Cited

U.S. PATENT DOCUMENTS

| | | | | |
|---|---|---|---|---|
| 3,938,080 | A * | 2/1976 | Hulme | 340/908.1 |
| 4,963,880 | A * | 10/1990 | Torre et al. | 343/866 |
| 5,608,765 | A * | 3/1997 | Tanoue | 375/365 |
| 5,751,220 | A * | 5/1998 | Ghaffari | 340/825.21 |
| 6,201,469 | B1 * | 3/2001 | Balch et al. | 340/10.1 |
| 6,320,507 | B1 * | 11/2001 | Strzelec et al. | 340/572.1 |
| 7,026,935 | B2 * | 4/2006 | Diorio et al. | 340/572.2 |
| 7,042,359 | B2 * | 5/2006 | Clucas | 340/572.1 |
| 7,212,117 | B2 * | 5/2007 | Frederick et al. | 340/572.1 |
| 2002/0135480 | A1 * | 9/2002 | Frederick et al. | 340/572.1 |
| 2006/0038659 | A1 * | 2/2006 | Takano et al. | 340/10.51 |
| 2006/0077039 | A1 * | 4/2006 | Ibi et al. | 340/10.1 |
| 2007/0109112 | A1 * | 5/2007 | Lee et al. | 340/447 |
| 2007/0141997 | A1 * | 6/2007 | Wulff et al. | 455/78 |
| 2008/0055085 | A1 * | 3/2008 | Samboursky et al. | 340/572.1 |

FOREIGN PATENT DOCUMENTS

| | | | |
|---|---|---|---|
| EP | 0 561 062 | A1 | 9/1993 |
| EP | 1 596 347 | A1 | 11/2005 |
| WO | WO 01/78028 | A2 | 10/2001 |
| WO | WO 02/063771 | A2 | 8/2002 |

OTHER PUBLICATIONS

PCT International Search Report, International Application No. PCT/US2006/025052, International Filing date Jun. 27, 2006, mailed Apr. 5, 2007, (4) sheets.

* cited by examiner

*Primary Examiner*—Davetta W Goins
*Assistant Examiner*—Hoi C Lau
(74) *Attorney, Agent, or Firm*—Dean D. Small; The Small Patent Law Group

(57) ABSTRACT

A system and method for providing wireless synchronized operation of electronic article surveillance (EAS) systems are provided. The method may include communicating wirelessly between each of a plurality of controllers connected to a plurality of detectors of the plurality of EAS systems and receiving with a communications receiver of each of the controllers wireless communications from at least some of the other plurality of controllers. The communications receiver may be separate from a tag detection receiver.

21 Claims, 4 Drawing Sheets

WIRELESS SYNCHRONIZED OPERATION OF PULSED EAS SYSTEMS

BACKGROUND OF THE INVENTION

1. Field of the Invention

This invention relates generally to electronic article surveillance (EAS) systems and, more particularly to a system and method for providing synchronized operation in EAS systems.

2. Description of the Related Art

In acoustomagnetic or magnetomechanical electronic article surveillance, or "EAS," a detection system may excite an EAS tag by transmitting an electromagnetic burst at a resonance frequency of the tag. When the tag is present within the electromagnetic field created by the transmission burst, the tag begins to resonate with an acoustomagnetic or magnetomechanical response frequency that is detectable by a receiver in the detection system. The detection unit may then provide some type of signal, for example, an alarm signal indicating the detection of a response from an EAS tag.

In EAS systems, the transmitter burst signal typically does not end abruptly, but instead decays exponentially because of transmitter circuit resonance. If the transmissions from nearby units are not time synchronized, false detections may occur because units may transmit and receive at the same frequency. These false detections can result in false alarms.

It is known to use a plurality of detection units, for example, a plurality of detection pedestals to monitor a larger area, such as the exit of a retail store. Each of these pedestals typically include multiple antennas that may be controlled from a single multi-channel controller. This controller coordinates and synchronizes the antenna operation of each of the detection pedestals.

It is also known to use separate controllers at each of the detection units. In this configuration, communication between the controllers is provided to coordinate operation of each of the units, including synchronizing the antenna operation. In these multiple controller systems it is known to use wired synchronization wherein a communication signal is transmitted between controllers via one or more wired connections. The installation and connection of wiring between the detection units may be complicated and time consuming. For example, if trenching an existing floor is needed to install the wiring, this process adds time and cost to the installation. Additionally, the likelihood of installation problems increase, for example, because of the complexity of installation or the use of special tooling.

It is also known to provide wireless synchronization to communicate with other controllers associated with other detection units. In these systems, synchronization communications are transmitted outside the normal transmit window. In particular, synchronization signals are transmitted during the receive window, which may corrupt receive signals over large distances. Further, high sensitivity receivers are used to detect the synchronization signals. This high sensitivity may result in controllers at different locations, for example, different exits, detecting synchronization signals intended for controllers in another location. Thus, isolation is a problem that can result in false communications and control problems.

BRIEF DESCRIPTION OF THE INVENTION

In one embodiment, a method of communicating information between a plurality of detectors in a plurality of electronic article surveillance (EAS) systems is provided. The method may include communicating wirelessly between each of a plurality of controllers connected to the plurality of detectors of the plurality of EAS systems and receiving with a communications receiver of each of the controllers wireless communications from at least some of the other plurality of controllers. The communications receiver may be separate from a tag detection receiver.

In another embodiment, a method for controlling transmissions between a plurality of electronic article surveillance (EAS) systems is provided. The method may include transmitting an excitation signal into an interrogation zone during a transmit phase, receiving signals from excited EAS tags in the interrogation zone during the transmit phase and determining a noise average during a noise average phase wherein no transmissions occur. The method may further include processing the received signals during a detection processing phase, wherein no transmissions or receptions occur, and wirelessly communicating information between a plurality of detectors of the plurality of EAS systems during a communications phase.

In yet another embodiment, a system having a plurality of electronic article surveillance (EAS) systems is provided. The system may include a plurality of detectors and a plurality of controllers each connected to at least one of the plurality of detectors and defining the plurality of EAS systems. The controller may have a communications receiver. The system also may include a communications antenna connected to the communications receiver and configured to receive wireless communication signals from other controllers.

BRIEF DESCRIPTION OF THE DRAWINGS

For a better understanding of various embodiments of the invention, reference should be made to the following detailed description which should be read in conjunction with the following figures wherein like numerals represent like parts.

DETAILED DESCRIPTION OF THE INVENTION

Various embodiments of the invention provide methods and systems for synchronized operation, and more particularly synchronizing operation, for example, communication and/or transmissions between several electronic article surveillance (EAS) systems, with each EAS system generally having one controller and at least one coil. A typical EAS system will first be described followed by various embodiments of the invention for controlling and configuring the EAS systems, and more particularly synchronizing operations in the EAS systems.

Figure 1:
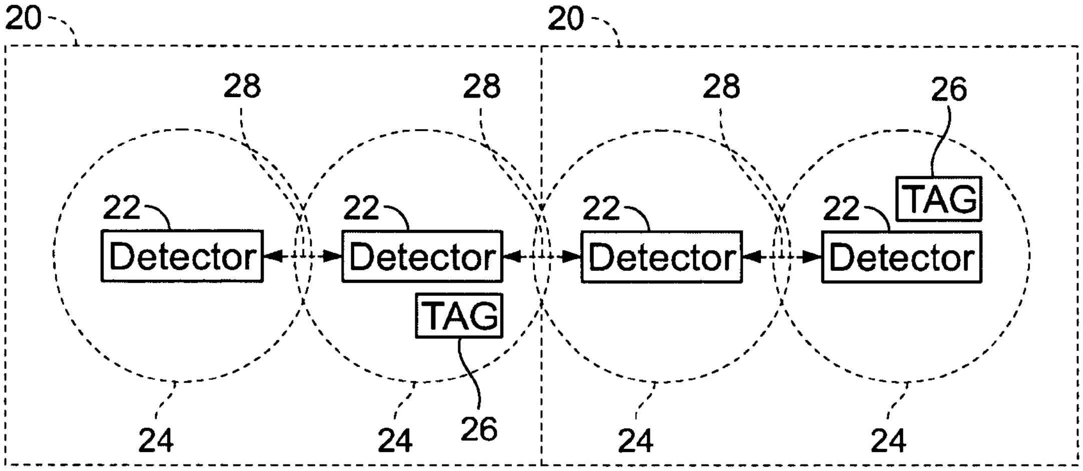
FIG. 1 is a block diagram of a portion of an electronic article surveillance (EAS) system in connection with which various embodiments of the invention may be implemented.

An embodiment of system having one or more EAS systems 20 is shown in FIG. 1. The EAS system 20 may include a plurality of detector units 22. Each of the detector units 22 may be configured to monitor an area 24 (e.g., within a certain range of the detector units 22) as is known to detect EAS tags 26 having a predetermined characteristic (e.g., resonant frequency). The coverage for each area 24 may overlap with adjacent areas 24. Further, the detector units 22 may be configured to communicate information therebetween using any suitable communication link. In one embodiment, communication between the detector units 22 is provided via a wireless communication link 28. It should be noted that any one of the detector units 22 may communicate with any or all of the other detector units 22.

Figure 2:
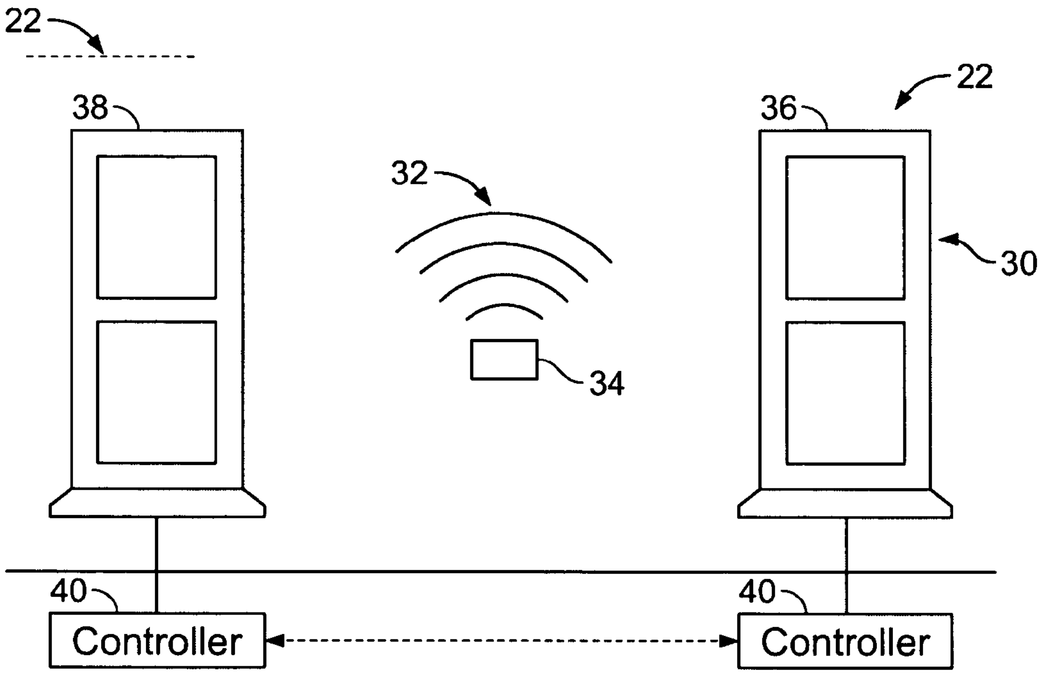
FIG. 2 is a diagram of a detector arrangement of the EAS system of FIG. 1 having controllers constructed in accordance with an embodiment of the invention.

The detector units 22 may be of any type as desired or needed, for example, a Sensormatic® detector unit available from Tyco Fire & Security of Boca Raton, Fla. As an example, FIG. 2 is an illustration of detector units 22 of the EAS system 20 that may be controlled and synchronized by the various embodiments of the invention as described herein. Specifically, each of the detector units 22 may include a detector portion 30 defining a detection area 32, for example, between different detector portions, for detecting an EAS tag 34 within the detection area 32. The detector portion 30 of each of the detector units 22 in one embodiment may include a plurality of antenna pedestals, for example, an antenna pedestal 36 and an antenna pedestal 38. The antenna pedestals 36 and 38 each may be connected to a controller 40 to control transmissions from the pedestals 36 and 38. Each controller 40 is also configured to communicate with the controllers 40 of other antenna pedestals. In other embodiments, a single controller 40 may be connected to a plurality of pedestals 36 or 38 to define an EAS system 20 (shown in FIG. 1).

In particular, the controllers 40 each may be configured to control (e.g., synchronize) transmissions from and receptions received at the antenna pedestals 36 and 38, such as transmission of excitation signals to the EAS tag 34 and reception of signals generated by the EAS tag 34. In operation, and for example, upon receiving a signal from an EAS tag 34 within the detection area 32 that has not been deactivated by the deactivator unit (not shown), a visual and/or audible alarm may be provided.

It should be noted that when reference is made herein to an EAS system 20, this generally means a system having one controller 40 and at least one coil, for example, within a antenna pedestal 36 or 38. However, the various embodiments may be implemented in connection with EAS systems 20 having different configurations. For example, the various embodiments may provide communication or transmissions between EAS systems 20 each having a single controller 40 connected to a plurality of pedestals 36 or 38. Also, the controller 40 may be embodied within a power pack or a single electronics unit.

Further, detector units 22 are representative of many detector systems and are provided as an example only. For example, the controllers 40 may be located within or adjacent each of the antenna pedestals. Additional antennas also may be provided that only receive signals from certain EAS tags 34.

Figure 3:
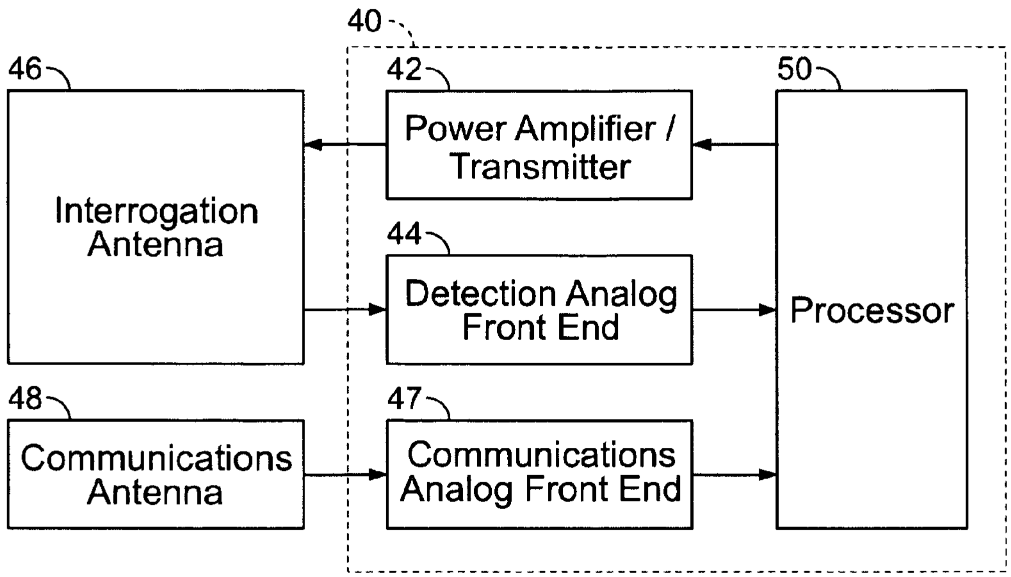
FIG. 3 is a block diagram illustrating a controller constructed in accordance with an embodiment of the invention.

A block diagram of a controller representative of and that may be embodied in the controller 40 is shown in FIG. 3. The controller 40 generally may include a power amplifier/transmitter unit 42 and a tag detection receiver, for example, a detection analog front end unit 44 that together define an EAS tag monitoring control portion that controls the transmission from and reception of signals at an antenna, which in one embodiment is an interrogation antenna 46. The power amplifier/transmitter unit 42 and the detection analog front end unit 44 may be provided in any known manner to control the transmissions and receptions at the interrogation antenna 46 to monitor for EAS tags within the EAS system 20 (shown in FIG. 1). It should be noted that the interrogation antenna 46 may be provided as part of the pedestals 36 and 38 (shown in FIG. 2).

The controller 40 also may include a wireless communications receiver, for example, a communications analog front end unit 47 connected to a communications antenna 48 to provide communication between different controllers 40 in one or more EAS systems 20 (shown in FIG. 1), for example, between controllers 40 connected to different pedestals as described in more detail below. In an embodiment, the communications antenna 48 may be a small, single loop antenna configured to receive communications from other controllers 40 and which may be used to synchronize the operation of the plurality of detector units 22 (shown in FIG. 1) and/or the plurality of EAS systems 20. The communications analog front end unit 47 may be configured to provide low gain operation (e.g., gain to communicate within a range of about twenty-five feet to about thirty-five feet) and bandpass filtering based on the communication frequencies of the controllers 40 as desired or needed. The gain of the communications analog front end unit 47 is configured such that the communications antenna 48 has only near field sensitivity. For example, the communications analog front end unit 47 may be configured such that communication is only provided between controllers 40 within a portion of the EAS system 20, between adjacent EAS systems 20, within a predetermined area (e.g., between controllers of pedestals at an exit of a retail store), etc. It should be noted that transmissions from one controller 40 to another controller 40 may be provided using the interrogation antenna 46 with the transmitted signals received using the separate communications antenna 48.

Figure 4:
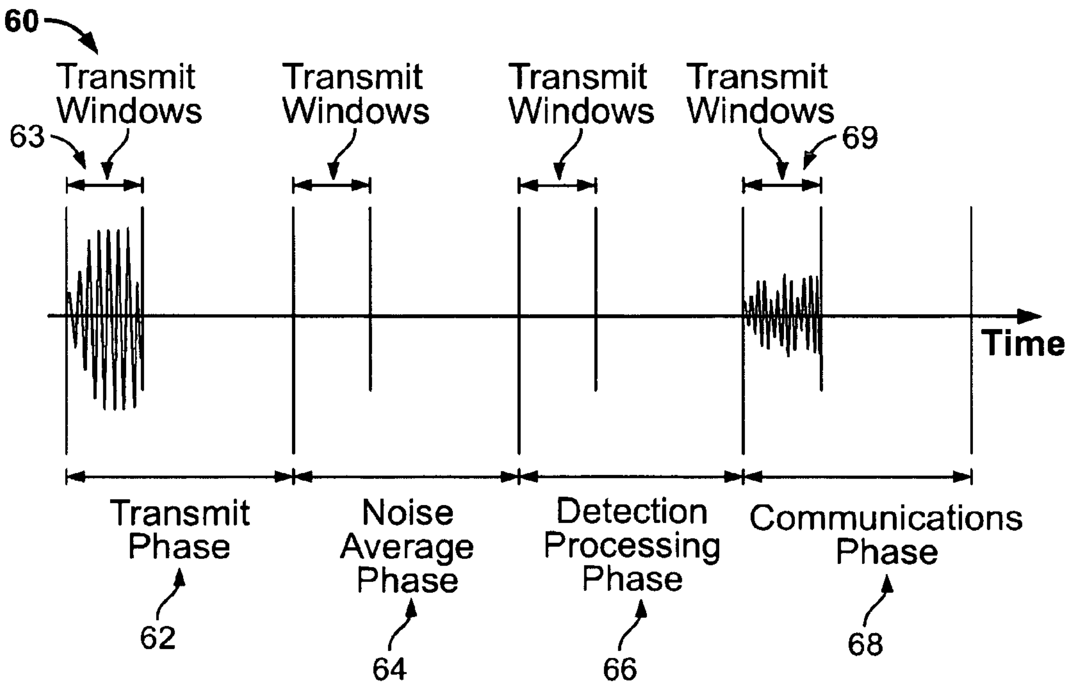
FIG. 4 is a timing diagram illustrating a multi-phase processing cycle in accordance with an embodiment of the invention.

The controller 40 also may include a processor 50 connected to each of the power amplifier/transmitter 42, detection analog front end 44 and the communications analog front end unit 47. The processor 50 may be configured to control communication between the controllers 40. In particular, and as shown in the timing diagram of FIG. 4, the controller 40 is configured to provide a multi-phase communication and/or processing cycle, for example, a four phase communication/processing cycle 60, which allows communication between the different controllers 40. It should be noted that the length or duration of each of the phases and/or of the transmit windows may be different. More particularly, a first phase 62 is a transmit phase wherein a high power, unmodulated transmit signal is transmitted into an interrogation zone, for example, the detection area 32 (shown in FIG. 2) during a transmit window 63. For example, a signal configured at a frequency or frequency range to excite any EAS tags within the interrogation zone is transmitted. The transmission may include transmitting, as is known, an electromagnetic burst at a resonance frequency of EAS tags to be detected using the power amplifier/transmitter 42 and interrogation antenna 46 (both shown in FIG. 3). In this first phase 62, signals from an excited EAS tag also may be received.

A second phase 64 is a noise average phase, wherein no transmissions occur. This phase is used to provide a noise level for comparison of any received signals, for example, from excited EAS tags. A third phase 66 is a detection processing phase, wherein no transmission or reception occurs. The third phase 66 is used for detection processing, which may be performed by the processor 50 (shown in FIG. 3), the results of which determine the message(s) to be transmitted from the controller 40 to the other controllers 40, for example, in connection with other pedestals at an exit of a retail store, which may be in different EAS systems 20. The result of this third phase 66 also may be the detection of an EAS tag, in which case a suitable alarm (e.g., audible or visual alarm) will be generated.

A fourth phase 68 is a communication phase, wherein a low power modulated transmit signal (e.g., communication burst) is transmitted from a controller 40 to other controllers 40, for example, adjacent or neighboring controllers 40 during a transmit window 69. The adjacent or neighboring controllers 40 may be in different EAS systems 20. The low power modulated transmit signal may be transmitted using the interrogation antenna 46 (shown in FIG. 3). While transmitting the communication signal, the controller 40 simultaneously monitors a dedicated low sensitivity receive channel for communication signals from other controllers 40. The communications analog front end unit 47 (shown in FIG. 3) may be configured to provide the receive channel. After the communications signal has been communicated and received by other controllers 40, the processor 50 (shown in FIG. 3) processes the received signal. For example, the communication signal may generally define a message signal and the processor 50 may demodulate the message signals from the other controllers 40 to determine further operations to be performed. For example, based on a local status and the status of one or more adjacent controllers 40 as determined by the communication signal, the controller 40 can determine the next operation to be performed at the next first phase 62, which is the next transmit phase. It should be noted that different communication phases and timing may be provided as desired or needed, for example, based on the type of EAS system or detector.

Figure 5:
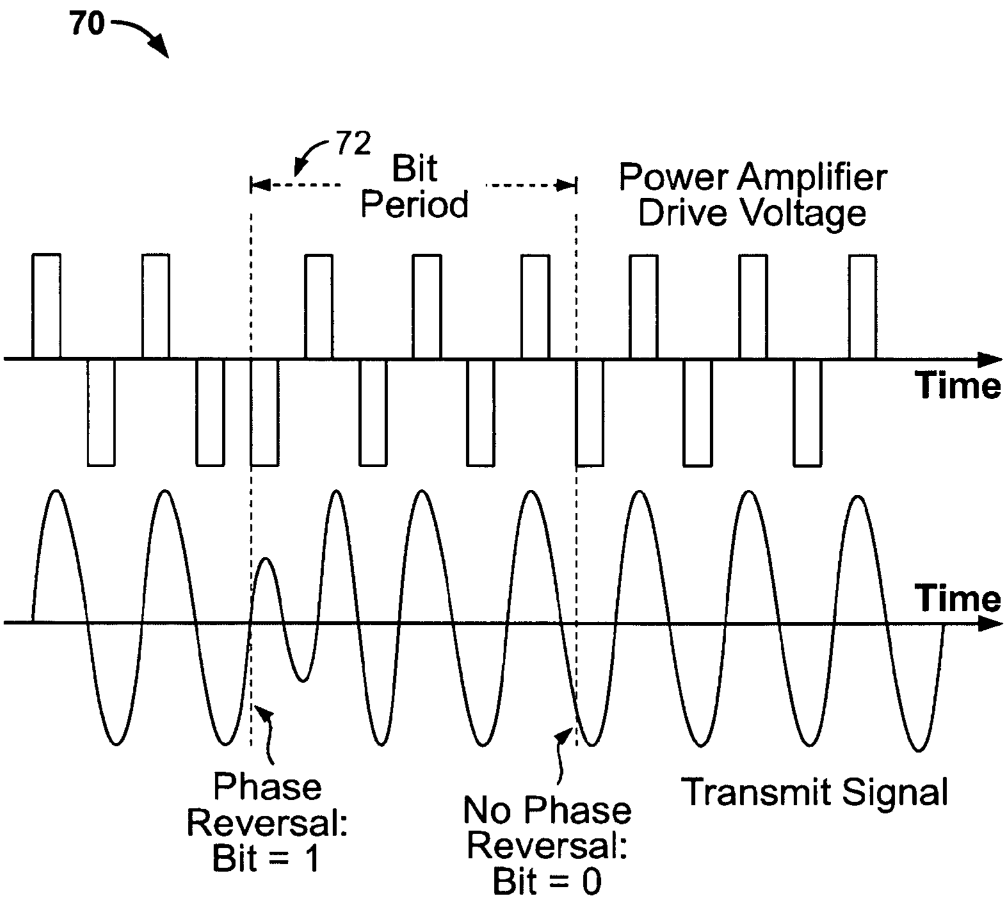
FIG. 5 is a diagram of a phase modulation scheme for coding message information in accordance with an embodiment of the invention.

Different messages may be communicated between controllers 40 by the communication signal during the communication phase 68 using a phase modulation scheme 70 as shown in FIG. 5. The phase modulation scheme 70 may be varied or modified based on, for example, the type of EAS system or type of detectors. The phase modulation scheme 70 may be used, for example, in connection with an EAS detector unit from Tyco Fire & Security of Boca Raton, Fla. In particular, assuming N bits are to be transmitted on each communication burst, a 1.6 millisecond (msec) communication burst may be divided into N+1 segments 72 wherein a first segment is configured to train the receiver, for example, the communications analog front end unit 47 on the signal phase. Subsequent segments 72 may be phase reversed to indicate a “1” bit or not phase reversed to indicate a “0” bit. Using phase modulation and/or amplitude and frequency modulation, different signals communicating different information may be provided. For example, a phase modulation scheme may be used wherein up to eight bits per burst may be transmitted. Using the modulation scheme 70, or other modulation schemes, different messages may be communicated between controllers 40 (shown in FIG. 3), including, for example, the following:

1. A “Tx Off Check” message to request adjacent detectors to inhibit interrogation bursts on the next transmit phase.

2. A “Validation” message to indicate that transmit sequencing should be held in the same state as the previous transmit phase while a tag signal is validated. This message may be used to repeat a signal at the same frequency and antenna phasing to determine if an adjacent detector should be turned off because that detector is exciting a tag in a different interrogation zone.

3. A “Zone Detect” message to determine which antenna “sees” an EAS tag signal stronger.

4. A “Synchronization” message to determine the timing of the transmission in the transmit phase for use in synchronizing transmissions.

It should be noted that other messages may be provided to control the operation, for example, control of the transmissions from the plurality of detectors 22 (shown in FIG. 1). It also should be noted that other modulation schemes for communicating the message information may be provided.

Figure 6:
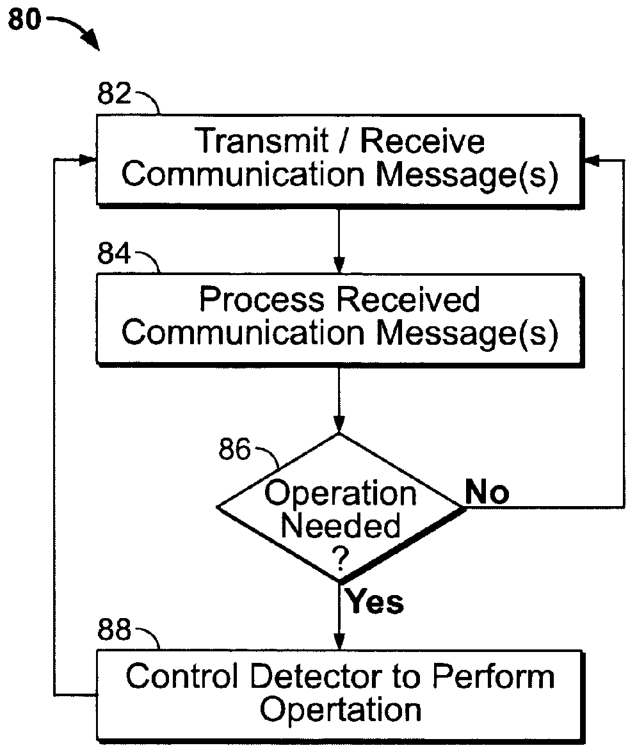
FIG. 6 is a flowchart of a method for controlling the transmissions of a plurality of detectors of an EAS system in accordance with an embodiment of the invention.

A method 80 for controlling operation of a plurality of EAS systems, for example, the transmissions of a plurality of detectors of the EAS systems is shown in FIG. 6. Specifically, at 82 communication messages are communicated (e.g., transmitted and received) between controllers associated with detectors of one or more EAS systems. This may include transmitting, via a transmission burst in a transmit window of a communication phase (shown in FIG. 4), a low power, modulated message signal (allowing higher data rate communications). The message signals, which are near field, full duplex signals, are communicated to local controllers, for example, controllers within a predetermined or predefined region of one or more EAS systems. During this communication phase, the controllers also receive message signals from other controllers, for example, over the dedicated low sensitivity receive channel as described in more detail above.

The message signals are then processed at 84, which may include demodulating the signal. In one embodiment, the phases of the signals between time periods (as shown in FIG. 5) are compared, for example, to determine if the phase is reversed or if a phase reversal pattern is identified. Control information or messages (as described above) may be coded into the phase changes, which are determined during this processing phase. Additionally, the present status of the detector also may be determined. Based on the processed received message signal and/or the status of the detector, a determination is made at 86 as to whether an operation is needed. If no operation is needed, for example, if the detector is in a hold state, then the method 80 returns to transmitting and receiving messages at 82, which may include transmitting a message including the current status of the detector. If operation is needed, for example, if a message is received indicating that the next transmit signal should be inhibited, then at 88, the detector is controlled accordingly (e.g., inhibiting the next transmission burst). Thereafter, the method 80 returns to transmitting and receiving messages at 82, which may include transmitting a message including the current status of the detector or the most recent operation (e.g., inhibiting a transmission burst).

Figure 7:
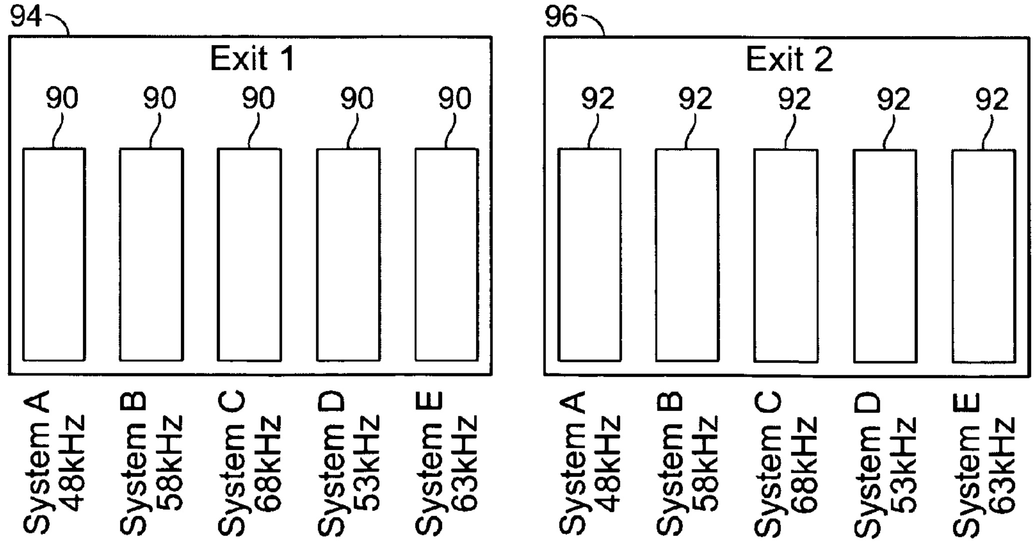
FIG. 7 is a block diagram of a plurality of detectors illustrating frequency division multiplexing and frequency reuse in accordance with an embodiment of the invention.

It should be noted that when a plurality of detectors 22 are provided in one area or location (e.g., exit of a retail store) defining one or more EAS systems 20, frequency division multiplexing may be used to separate the signals of the controllers as shown in FIG. 7. Additionally, frequency reuse may be provided across controllers at different locations (e.g., different exits) of the EAS systems. A plurality of pedestals 90 and 92, may be provided at each of a first location 94 (e.g., first exit) and a second location 96 (e.g., second exit), respectively. For example, a plurality of EAS pedestals from Tyco Fire & Security of Boca Raton, Fla. may be provided having five different available frequency channels (e.g., 48 kHz, 53 kHz, 58 kHz, 63 kHz and 68 kHz). Each pedestal 90 and 92, within each of the first and second locations 94 and 96 may be configured to transmit on a different available frequency, with frequencies reused at each of the first and second locations 94 and 96.

Thus, the various embodiments of the invention provide for controlling, and more particularly, synchronizing the operation of detection units in a plurality of EAS systems. For example, the synchronized operation may be used to determine whether an EAS tag is being detected between two detectors or whether signals from one detector are interfering with another detector. A separate communication antenna is provided that is configured having a dedicated low sensitivity receive channel. Low power, modulated communication transmissions providing higher data rate communication are thereby provided between controllers connected with each of a plurality of detectors of the EAS systems. The communication of messages is performed during a communication burst window of a communication phase. Near field sensitivity and frequency division multiplexing allows for full duplex communications.

The various embodiments or components, for example, the controller 40 or other components, may be implemented as part of a computer system, which may be separate from or integrated with the EAS systems. The computer system may include a computer, an input device, a display unit and an interface, for example, for accessing the Internet. The computer may include a microprocessor. The microprocessor may be connected to a communication bus. The computer may also include a memory. The memory may include Random Access Memory (RAM) and Read Only Memory (ROM). The computer system further may include a storage device, which may be a hard disk drive or a removable storage drive such as a floppy disk drive, optical disk drive, and the like. The storage device may also be other similar means for loading computer programs or other instructions into the computer system.

As used herein, the term "computer" may include any processor-based or microprocessor-based system including systems using microcontrollers, reduced instruction set circuits (RISC), application specific integrated circuits (ASICs), logic circuits, digital signal processors and any other circuit or processor capable of executing the functions described herein. The above examples are not intended to limit in any way the definition and/or meaning of the term "computer".

The computer system executes a set of instructions that are stored in one or more storage elements, in order to process input data. The storage elements may also store data or other information as desired or needed. The storage element may be in the form of an information source or a physical memory element within the processing machine.

The set of instructions may include various commands that instruct the computer as a processing machine to perform specific operations such as the methods and processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are examples only, and are thus not limiting as to the types of memory usable for storage of a computer program.

It is to be understood that variations and modifications of the various embodiments of the present invention can be made without departing from the scope thereof. It is also to be understood that the scope of the various embodiments invention is not to be interpreted as limited to the specific embodiments disclosed herein, but only in accordance with the appended claims when read in light of the forgoing disclosure.

What is claimed is:

1. A method for controlling transmissions between a plurality of electronic article surveillance (EAS) systems, the EAS systems including detectors and controllers, said method comprising:

transmitting, from a detector of a first EAS system, an excitation signal into an interrogation zone during a transmit phase of the first EAS system;

receiving signals, at the detector, from excited EAS tags in the interrogation zone;

determining noise information during a noise detection phase of the first EAS system, wherein the excitation signal does not occur during the noise detection phase, the noise information representative of a noise level experienced at the detector of the first EAS system;

processing the received signals during a detection processing phase; and wirelessly communicating messages between the controllers of the plurality of EAS systems during a communications phase of the first EAS system that occurs outside the transmit phase.

2. A method in accordance with claim 1 wherein wirelessly communicating messages comprises transmitting one of phase, amplitude and frequency modulated messages.

3. A method in accordance with claim 1 wherein wirelessly communicating messages comprises using an interrogation antenna to transmit the messages during the communications phase, and using the interrogation antenna to transmit the EAS excitation signal during the transmit phase, and using a communications antenna to receive the wirelessly transmitted messages during the communications phase.

4. An electronic article surveillance (EAS) system, said system comprising:

detectors configured to monitor associated interrogation zones for EAS tags;

controllers connected to the corresponding detectors, the controllers each having a transmitter and a receiver, the transmitter configured to transmit an EAS excitation signal into the interrogation zones during a first window, the receiver connected to the detectors and configured to receive a signal generated by an EAS tag; and a communications channel configured to convey wireless communication messages, outside the first window, between the controllers, the messages being used by the controllers to control transmission of the EAS excitation signals.

5. A system in accordance with claim 4 wherein the controllers are configured to transmit the messages during a communication phase that occurs different in time from a transmit phase in which the EAS excitation signal is transmitted.

6. The system in accordance with claim 5 further comprising an interrogation antenna to transmit the EAS excitation signals and a communications antenna to transmit the messages, wherein the messages and the EAS excitation signals are transmitted separate from one another.

7. A system in accordance with claim 4 wherein the controller is configured to one of phase, amplitude and frequency modulate the message as a wireless communication signal.

8. A method for synchronizing operation of detectors within an electronic article surveillance (EAS) system, the method comprising:

providing controllers that are connected to detectors of at least one EAS system, the detectors configured to monitor associated interrogation zones for EAS tags, the controllers configured to cause the detectors to transmit EAS excitation signals into the interrogation zones during a first window and receive signals from excited EAS tags;

providing a wireless communications channel between the controllers;

transmitting, outside the first window, messages between the controllers over the wireless communications channel, the messages being used by the controllers to control transmission of the EAS excitation signals.

9. A method in accordance with claim 8 further comprising configuring an antenna to receive the messages over the wireless communications channel separate from the signals from the excited EAS tags.

10. A method in accordance with claim 9 wherein the antenna comprises a single loop antenna.

11. A method in accordance with claim 8 further comprising wirelessly transmitting the messages from one of the controllers to at least one of the other controllers during a communication phase separate from the first window, the first window representing a tag activation transmit phase.

12. A method in accordance with claim 8 wherein the transmitting further comprises at least one of phase, amplitude and frequency modulating the messages, the EAS excitation signals being unmodulated.

13. A method in accordance with claim 8 further comprising configuring the communications channel to have near field sensitivity.

14. A method in accordance with claim 8 wherein the transmitting occurs during a communication phase for communicating the messages between the controllers separate from at least one of a transmit phase, a noise average phase and a detection processing phase.

15. A method in accordance with claim 8, further comprising connecting each of the controllers to a different one of the detectors.

16. A method in accordance with claim 8, wherein the detectors are configured as pedestal units.

17. A method in accordance with claim 8, further comprising receiving the signals from the excited EAS tags at a tag detection receiver and receiving the messages at a separate communications receiver.

18. A method in accordance with claim 8, wherein a first controller has an associated first detector, the first controller transmitting a message requesting that the detectors, that are adjacent to the first detector, inhibit the EAS excitation signals during a next transmit phase.

19. A method in accordance with claim 8, wherein the messages include a zone detect message utilized by at least one of the controllers to determine which of the detectors receives a stronger signal from the excited EAS tag.

20. A method in accordance with claim 8, further comprising receiving signals at the detectors during a noise detection phase in which no EAS excitation signals are transmitted; and utilizing the signals received during the noise detection phase to obtain a noise level.

21. A method in accordance with claim 8, wherein the transmitting includes transmitting a communications message from a first controller while the first controller simultaneously monitors a low sensitivity receive channel for communications messages from at least one of the other controllers.

* * * * *